(12) United States Patent
Geislinger et al.

(10) Patent No.: US 8,418,822 B2
(45) Date of Patent: Apr. 16, 2013

(54) TORSIONAL VIBRATION DAMPER OR TORSIONALLY FLEXIBLE COUPLING

(75) Inventors: Matthias Geislinger, Salzburg (AT); Cornelius Geislinger, Salzburg (AT)

(73) Assignee: Ellergon Antriebstechnik Gesellschaft m.b.H. (AT)

( * ) Notice: Subject to any disclaimer, the term of this patent is extended or adjusted under 35 U.S.C. 154(b) by 429 days.

(21) Appl. No.: 12/652,222

(22) Filed: Jan. 5, 2010

(65) Prior Publication Data
US 2010/0171248 A1   Jul. 8, 2010

(30) Foreign Application Priority Data
Jan. 7, 2009 (DE) .......................... 10 2009 004 253

(51) Int. Cl.
*F16F 7/116* (2006.01)
*F16D 3/52* (2006.01)

(52) U.S. Cl.
USPC .............................. 188/380; 464/82; 464/100

(58) Field of Classification Search .................. 188/379, 188/380; 464/24, 81, 82, 84, 100
See application file for complete search history.

(56) References Cited

U.S. PATENT DOCUMENTS

| | | | | |
|---|---|---|---|---|
| 1,595,763 | A * | 8/1926 | Eaton | 464/82 |
| 3,996,767 | A * | 12/1976 | Geislinger | 464/82 |
| 4,104,891 | A | 8/1978 | Geislinger | |
| 4,307,585 | A * | 12/1981 | Chivari | 464/82 |
| 4,337,629 | A * | 7/1982 | Walter | 464/24 |
| 6,238,294 | B1 | 5/2001 | Martinek | |
| 7,025,681 | B2 | 4/2006 | Geislinger | |

FOREIGN PATENT DOCUMENTS

| | | |
|---|---|---|
| DE | 1233215 | 1/1967 |
| DE | 2444787 | 4/1975 |
| DE | 2818295 A1 * | 10/1979 |
| DE | 19839470 | 3/1999 |
| DE | 20209545 | 10/2003 |
| EP | 23246 A1 * | 2/1981 |
| GB | 2001731 | 2/1979 |
| GB | 2011030 A * | 7/1979 |
| GB | 2111169 | 6/1983 |
| JP | 03-149417 | 6/1991 |
| JP | 2000-027888 | 1/2000 |
| JP | 2002-115726 | 4/2002 |

OTHER PUBLICATIONS

English translation of Notice of Reasons for Rejection for corresponding Japanese Patent Application No. P2010-000704 with dispatch date of May 29, 2012.
European Search Report for corresponding EP Application No. 10150246.6 dated May 7, 2010.
Applicant response to European Search Report for Corresponding EP Application No. 10150246.6 dated Jan. 14, 2011.
English translation of Notice of Office Action for corresponding Korean Patent Application No. 10-2010-0001414 with dispatch date of Apr. 13, 2012.
English translation of Text of the First Office Action for corresponding Chinese Patent Application No. 201010300075.3 with dispatch date of Aug. 15, 2012.

* cited by examiner

*Primary Examiner* — Thomas J Williams
(74) *Attorney, Agent, or Firm* — Myers Wolin, LLC

(57) ABSTRACT

A torsional vibration damper or a torsionally flexible coupling comprises an inner part and an outer part that is arranged in ring shape around this inner part, which are joined to one another in a torsionally flexible manner by spring elements, wherein the spring elements subdivide a space formed between the inner part and the outer part into a plurality of successive chambers in the circumferential direction of the damper or the coupling, with these chambers being filled with a viscous medium and connected to one another. There are at least two groups of spring elements which have deflection lines that differ in the circumferential direction. In case of a relative rotation between the inner part and the outer part, owing to differences in deflection lines, there is a strong spatial displacement of the damping medium, so that such a damper or coupling has a high damping potential.

22 Claims, 4 Drawing Sheets

TORSIONAL VIBRATION DAMPER OR TORSIONALLY FLEXIBLE COUPLING

Figure 1:
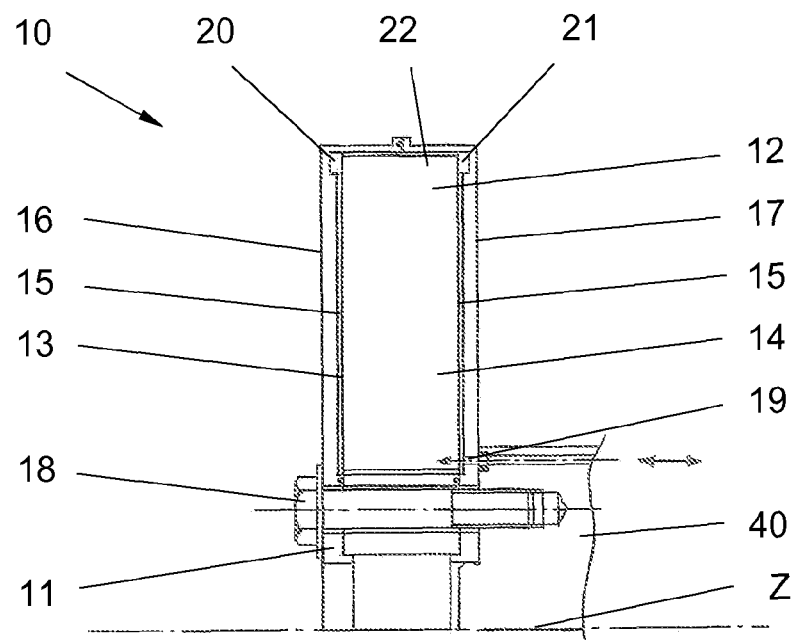

This invention claims priority under 35 USC §119 to German Patent Application No. 10 2009 004 253.9, filed Jan. 7, 2009, the entire contents of which are incorporated herein by reference.

The invention relates to a torsional vibration damper as well as a torsionally flexible coupling with an inner part and an outer part that is arranged in ring shape around this inner part, which are joined to one another in a torsionally flexible manner by means of spring elements, wherein the spring elements subdivide a space formed between the inner part and the outer part into a plurality of successive chambers in the circumferential direction of the damper or the coupling, with these chambers being filled with a viscous medium and connected to one another. In case of a relative rotation between the inner part and the outer part, the displacement of the viscous medium within the chambers causes a damping effect.

Torsional vibration dampers of this type are used primarily in large, slow-running or medium-fast two-stroke and four-stroke diesel engines and gas engines for counteracting the torsional vibrations in the power train. The torsional vibration damper, whose outer diameter can be up to three meters, is, for example, flanged to the crankshaft of the engine. Torsional vibration dampers of the type mentioned above, however, can also be used on other rotating parts such as camshafts, intermediate shafts and axle drive shafts, as well as gearboxes. If the outer part and the inner part are coupled between tow rotating components, such a damper can be used as a torsionally flexible viscous damped coupling. Such torsional vibration dampers and torsionally flexible couplings are familiar from patents such as U.S. Pat. Nos. 6,238,294 B1, 7,025,681 B1, DE 198 39 470 B4 and DE 1 233 215.

While in the embodiments familiar from U.S. Pat. Nos. 6,238,294 B1, 7,025,681 B1 and DE 198 39 470 B4, the chambers are separated from one another by intermediate pieces fastened on the outer part, and the viscous medium—in case of a relative rotation between the outer part and the inner part—is displaced through overflow gaps between the inner circumferential sections of the intermediate pieces and outer circumferential sections of the inner part, such intermediate pieces are absent in the solution familiar from DE 1 233 215, in which overflow gaps lead laterally past the spring elements. However, the damping action of the torsional vibration damper without intermediate pieces, familiar from DE 1 233 215, is in need of improvement.

The object of the present invention is to provide a torsional vibration damper or a torsionally flexible coupling that is free of intermediate pieces and which damper or coupling has improved damping properties.

This object is accomplished by a torsional vibration damper or torsionally flexible coupling comprising an inner part, an outer part that is arranged in ring shape around the inner part, and spring elements, which join the inner part and outer part in a torsionally flexible manner, wherein the spring elements subdivide a space formed between the inner part and the outer part into a plurality of successive chambers in the circumferential direction of the damper or the coupling, with these chambers being filled with a viscous medium and connected to one another, characterized in that at least two groups of spring elements are provided, which have deflection lines that differ in circumferential direction.

In case of a relative rotation between the inner part and the outer part, owing to the differences in the deflection lines of the spring elements as compared to a damper in which all the spring elements have similar deflection lines, there is an enhanced spatial displacement of the damping medium, so that such a damper or coupling has an increased damping potential. The damping action can be primarily influenced by the dimensioning of the overflow behavior between the chambers, which are connected to one another directly past the spring elements.

According to an advantageous embodiment of the invention, at least one part of the spring elements is formed on the inner part and with one free end supported by the outer part. Moreover, at least one part of the spring elements can be formed on the outer part and with the free end supported by the inner part. Furthermore, it is possible to form separate spring elements as leaf springs tapering in the radial direction, which are fixed at one end in a tapering groove on the inner part or outer part and whose other end is supported by the other part in each case, i.e. the outer part or the inner part as the case may be. These embodiments can be combined at will with one another in a damper or in a coupling.

For obtaining different deflection lines, for example, one group of spring elements may taper from the inner part towards the outer part and one other group of spring elements may taper in the opposite direction from the outer part towards the inner part. In an advantageous embodiment, the spring elements are formed wedge-shaped in the radial direction.

The support at the free ends is preferably provided by means of grooves on the outer circumference of the inner part or the inner circumference of the outer part. In this arrangement, a separate groove can be provided for each of the spring elements.

In an additional advantageous embodiment, two parallel spring elements engage at their free ends with a common groove. Here, at least in an unloaded state of the damper or the coupling, one spring element each is in contact with a groove flank, while the free ends of the spring elements are spaced apart in the circumferential direction of the damper or the coupling. This enables repeated load on the springs and thus a high utilization of material and a compact design.

If two separate spring elements with similar deflection lines are fixed in a tapered groove on the inner part or the outer part, they can be spaced apart by one or more inserts, so that the spring elements deflect in parallel. This allows alternating loading of the springs.

If the insert or inserts are not led right up to the spring tips or if the spring elements are spaced apart only in the zone of fixing, then the spring elements of a spring element pair whose free ends are supported by a common groove can be braced against each other in the circumferential direction of the damper or the coupling. Apart from the desired overflow gaps in the area of the axial end faces of the spring elements, this results in an improved sealing of the chambers from one another. In addition, the damper or the coupling is in zero crossing, which means that with the inner part and the outer part aligned with each other without relative rotation, there is zero clearance.

Furthermore, it is possible to make the inner part, the outer part and the spring elements in one piece, with the spring elements being designed as wedge-shaped, tapering spokes. In particular, spokes tapering towards the inside and spokes tapering towards the outside can be provided. However, other forms are also possible, as long as at least two groups of spring elements with different deflection lines are present. For example, the spring elements can have a Z-shape.

According to another advantageous embodiment, the chambers are delimited in the axial direction by side plates, wherein overflow gaps are formed between the spring elements and the side plates, which connect the adjacent chambers with one another. By means of a suitable dimensioning of the overflow gaps, the damping behavior can be adjusted according to requirement. From a production engineering perspective, this can be made feasible by providing the corresponding recesses on the side plates.

The side plates can, for example, be fastened to the inner part and in connection with it form a housing that surrounds the outer part. Such a configuration has only static seals and hence an extremely reliable oil tightness. Such dampers can be used, for example, outside an engine crankcase.

In an advantageous embodiment, between a ring section of the outer part and the side plates, there is one sliding bearing each arranged in the axial direction. The sliding bearings hold the outer part in axial position. In the radial direction, the outer part can be centered with the inner part by means of the spring elements.

An oil pressure supply of the chambers can be provided through one or several bores on a side plate, wherein some of the bores may be used as oil supply bores and the others as oil return bores.

In an alternative embodiment, the side plates are fastened to the outer part. Here, an axial seal is arranged each between the inner part and the side plates. An oil pressure supply of the chambers can be provided through radial bores in the inner part. In particular, the damper or the coupling as the case may be can be supplied with oil through a shaft that is connected to it.

Moreover, it is possible to arrange several disc-shaped outer parts and inner parts with corresponding spring elements axially connected in series between two side plates. In particular, this is required, when the outer part and/or the inner part are manufactured by a cutting process with limited cutting depth and a large axial length is required on the damper.

Figure 2:
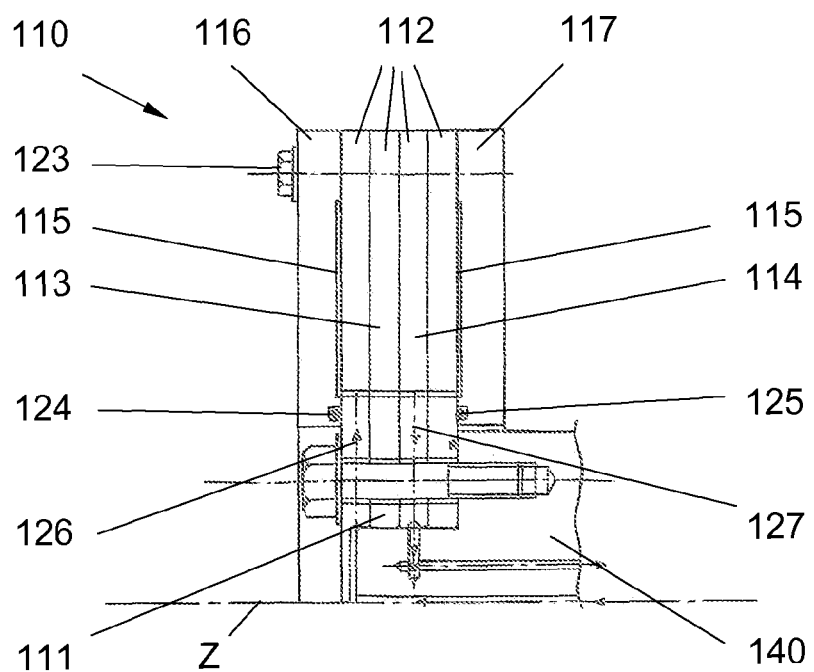
Figure 3:
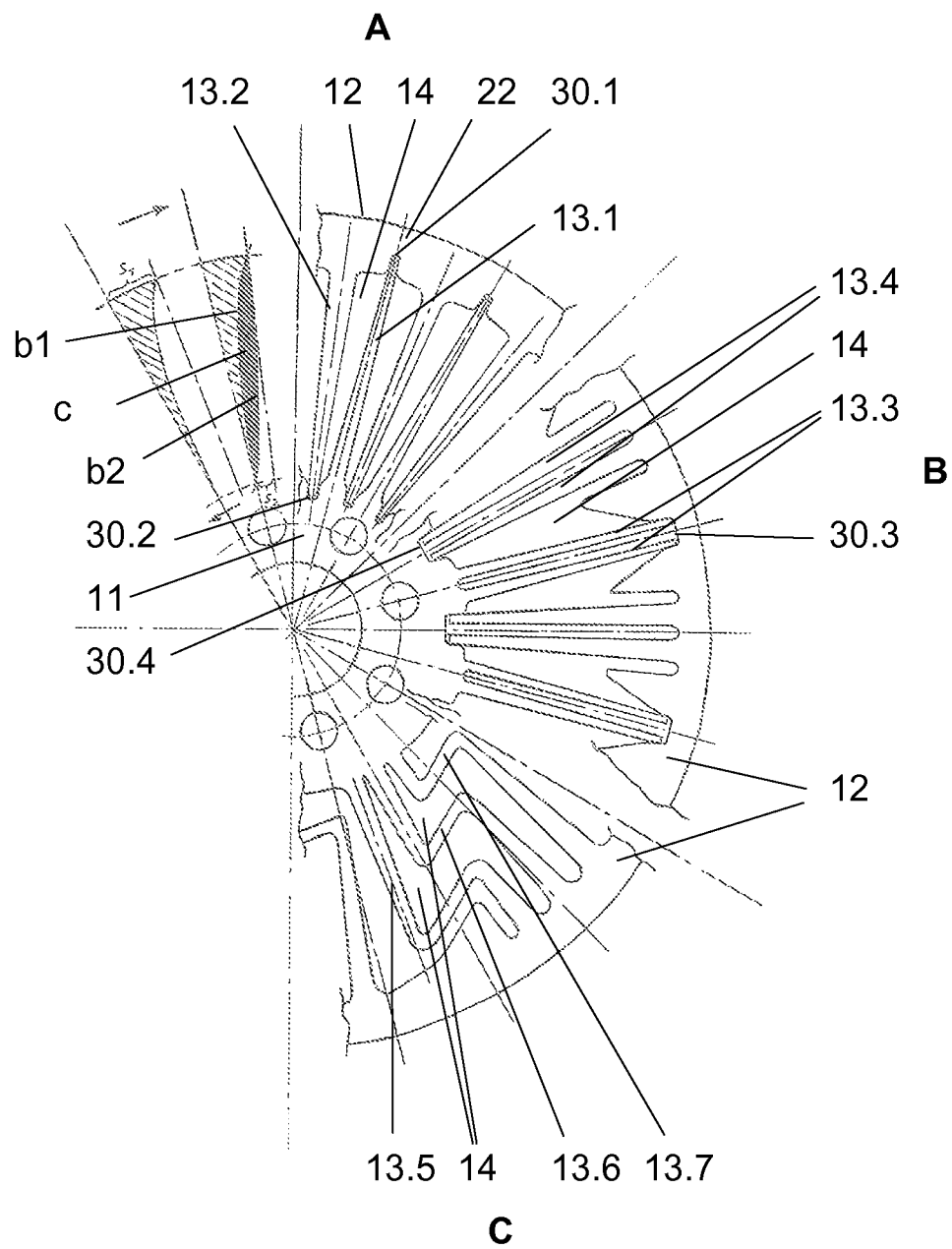
Figure 4:
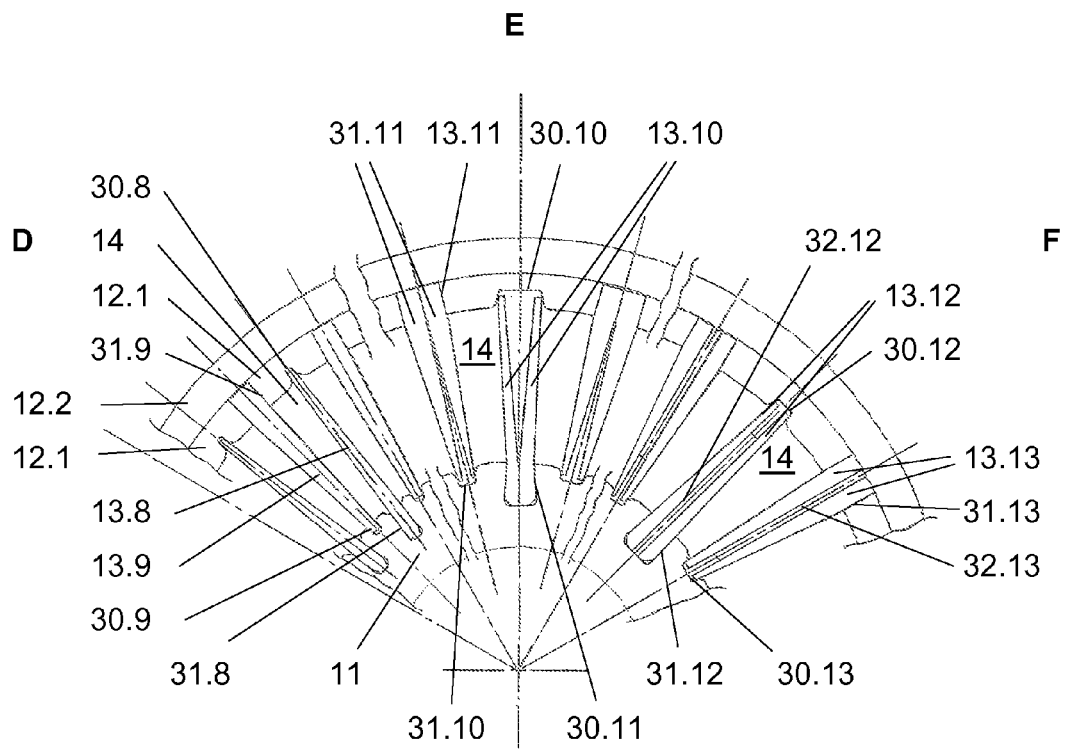
Figure 5:
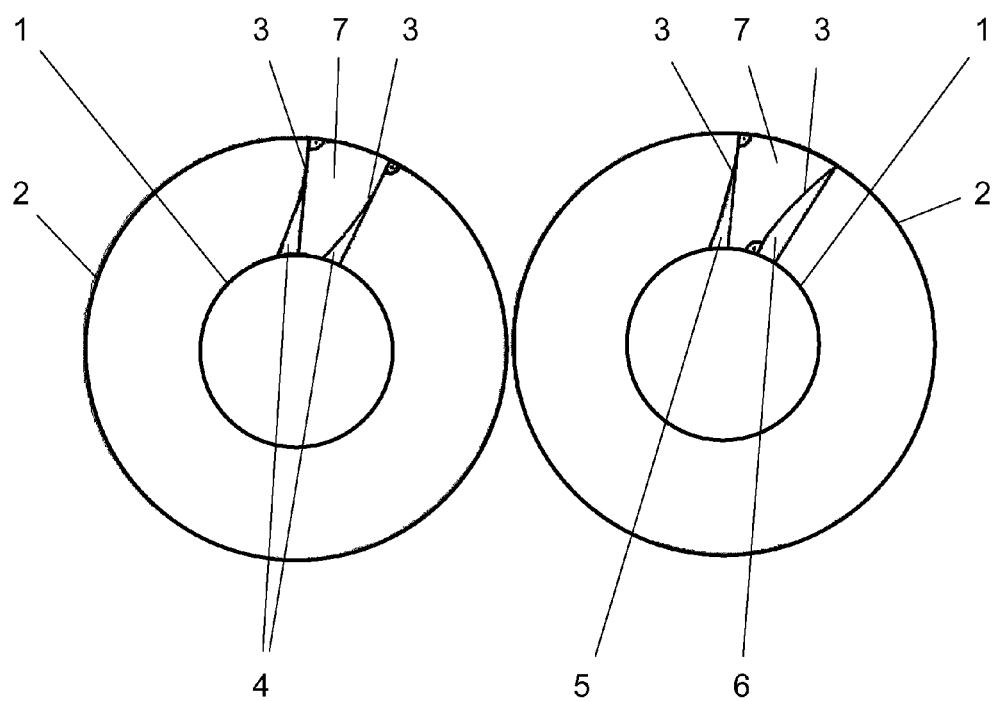

The following detailed description of the present invention will be given with the help of the exemplary embodiments shown in the accompanying drawing. The drawing shows in:

FIG. 1 a half-section of a first exemplary embodiment of a torsional vibration damper according to the invention, FIG. 2 a half-section of a second exemplary embodiment of a torsional vibration damper according to the invention, FIG. 3 a cross-sectional view of different spring element configurations A to C, and in FIG. 4 a cross-sectional view of additional spring element configurations D to F, FIG. 5 a schematic view showing the technical function of the invention (right) compared to the prior art (left).

The torsional vibration damper 10 shown in FIG. 1, which can be coupled to a rotating component such as a crankshaft 40, comprises a preferably rotationally symmetric inner part 11 with a rotational axis Z as well as an outer part 12 that is concentric to the inner part 11 and extends in ring shape around the inner part 11. The inner part 11 and the outer part 12 are joined to one another with a plurality of torque-transmitting spring elements 13, which subdivide a space formed between the inner part 11 the outer part 12 into a plurality of successive chambers 14 in the circumferential direction of the damper 10. The space is ring-shaped and concentric to the rotational axis Z. The chambers 14 are filled with a viscous medium and connected to one another by overflow gaps 15. In case of a relative rotation between the inner part 11 and the outer part 12, a deformation of the spring elements 13 and a displacement of damping medium through the overflow gaps 15 occur, resulting in a damping effect.

The overflow gaps 15 are positioned between the axial end faces of the spring elements 13 and side plates 16 and 17, which delimit the chambers 14 in the axial direction. By means of the dimensioning of the overflow gaps 15, the overflow behavior between the chambers 14 and hence the damping action can be adjusted.

In the exemplary embodiment shown in FIG. 1, the side plates 16 and 17 are fastened to the inner part 11. They extend radially around the outer part 12 and in connection with the inner part 11, form a housing that surrounds the outer part 12. This housing, which has high oil tightness, can, for example, be fastened to a crankshaft 40 by means of a threaded connection 18. By means of this threaded connection 18, the side plates 16 and 17 can be simultaneously braced with the inner part 11. However, the inner part 11 can also be fastened to a rotating component by other means.

The oil pressure supply to the chambers 14 is provided through one or more oil feed bores 19, which are arranged outside the PCD of the screws, for example in one of the side plates 17. There are one or more oil return bores, not shown in detail, which are positioned pitch-displaced to the oil feed bores. However, oil supply and/or discharge can also be realized through the inner part 11.

As also shown in FIG. 1, the outer part 12 is held axially in position by two sliding bearings 20 and 21. The sliding bearings 20 and 21 are axially integrated between a ring section 22 of the outer part 12 and the side plates 16 and 17. In the radial direction, the outer part 12 is sufficiently centered through the mutual engagement of the spring elements 13 with the inner part 11 and the outer part 12, with respect to the inner part 11.

An additional torsional vibration damper 110 is shown in FIG. 2. It, too, has an inner part 111 and an outer part 112 that is arranged in ring-shape around this inner part, which are joined to one another in a torsionally flexible manner by means of spring elements 113. The spring elements 113 in turn subdivide a space formed between the inner part 111 and the outer part 112 into a plurality of successive chambers 114, which are filled with oil from an oil supply that is not shown and connected to one another through overflow gaps 115. Here too, the chambers 114 are delimited in the axial direction by two side plates 116 and 117. Unlike the first exemplary embodiment, however, they are fastened to the outer part 112. This may, for example, be accomplished with the threaded connection 123 shown in FIG. 2. The fastening of the side plates 116 and 117 to the outer part 112 results in an increased moment of inertia, which is of advantage for a damper.

For sealing, an axial seal 124 and 125 each is arranged between the inner part 112 and the side plates 116 and 117. Further, the inner part 111 has one or more radial bores 126 and 127 for the oil pressure supply to the chambers 114, with the first bores 126 for oil supply being connected to a central bore of a shaft 140 and additional, axially displaced bores 127 for the oil return being connected to another bore of the shaft 140. The oil pressure supply can, however, also be provided in any other manner.

Moreover, FIG. 2 shows several, i.e. four each of disc-shaped inner parts 111 and outer parts 112 with corresponding spring elements 113 axially connected in series and braced between the two side plates 116 and 117. This is required, in particular, when the cutting tool used for making the components has a limited cutting depth. However, it is of course possible to provide a smaller number of inner parts 111 and outer parts 112, for example, one each or a greater number. This principle can also be applied to the exemplary embodiment shown in FIG. 1, if a large axial length of the damper is required there.

Furthermore, the threaded connection 123 shown in FIG. 2 can be used for coupling the outer part 112 to a component to be driven, so that the torsional vibration damper shown becomes a torsionally flexible coupling. Alternatively, a corresponding fixing flange can be formed on one of the side parts 116 or 117 or one of the outer parts 112.

In the case of the dampers or couplings shown in FIGS. 1 and 2, with a relative rotation between the inner part and the outer part, an oil displacement between adjacent chambers 14 or 114 and hence a damping effect is achieved, whose extent can be precisely adjusted by means of the overflow gaps 15 or 115 leading past the spring elements 13 or 113.

For this, in every damper or every coupling, at least two groups of spring elements 13 or 113 are provided, which have different deflection lines in the circumferential direction. Spring elements 13 or 113 with different deflection lines delimit a chamber 14 or 114 respectively in such a way that in case of relative rotation between the inner part 11 or 111 and the outer part 12 or 112, there is a change in volume of the chamber 14 or 114. The bending compliance in the circumferential direction varies in radial direction. This results in different displacement of the viscous medium in neighboring chambers 14 or 114 at different radii around the rotational axis Z. The viscous medium is thus caused to flow through the overflow gaps 15 or 115 past the spring elements 13 or 113.

Examples of suitable spring element configurations are shown in further detail in FIGS. 3 and 4; it is expressly pointed out here that the invention is not limited to these configurations shown, but basically includes all embodiments that have spring elements with different deflection lines.

FIG. 3 shows a first variant A, in which a first group of spring elements 13.1 is formed on the inner part 11 and is supported with its free ends on the outer part 12. A second group of spring elements 13.2 is formed on a ring section 22 of the outer part 12 and supported with its free ends on the inner part 11. The free ends in the above are each supported by a groove 30.1 or 30.2 on the other part with zero-clearance.

The spring elements 13.1 and 13.2 both taper in a wedge-shape towards their free ends and are arranged alternately in the circumferential direction, so that in case of a relative rotation s1 between the inner part 11 and the outer part 12, the spring elements 13.1 and 13.2 have different deflection lines b1 and b2 with a compliance in circumferential direction that varies in radial direction. The area marked c represents the cross-section of a change in volume of a chamber 14 caused by the different deflection lines b1 and b2, which results in an increased displacement of the viscous medium within the chamber.

Variant B shows another version of the first variant A, in which the individual spring elements 13.1 and 13.2 on the inner part 11 and on the outer part 12 are replaced by two parallel spring elements 13.3 or 13.4, which have the same deflection lines and engage at their free ends with a common groove 30.3 or 30.4. At least in an unloaded state of the damper or the coupling, one spring element 13.3 or 13.4 each is in contact with a groove flank, while the free ends of the spring elements are spaced apart in the circumferential direction.

In Variant C, three groups of spring elements 13.5, 13.6 and 13.7 with different deflection lines are provided. In contrast to variant A or B, these spring elements as well as the inner part 11 and the outer part 12 are made as one single piece. Here, the individual spring elements 13.5, 13.6 and 13.7 have different Z-shapes. However, it is possible to deviate from this form, as long as there are different deflection lines between adjacent spring elements in the circumferential direction. For example, it is also possible to form the spring elements shown in the variants A and B both on the inner part 11 and on the outer part 12.

FIG. 4 shows three additional variants D, E and F, in which the spring elements are made as separate components and are fastened or at least supported by the inner part 11 and the outer part 12. Here, the spring elements are designed as leaf springs, which taper in the radial direction in a wedge shape.

In Variant D, there is a first group of spring elements 13.8 fastened to the inner part 11 and with its free ends, supported by the outer part 12. These spring elements 13.8 taper from the inner part 11 towards the outer part 12. For fastening on the inner part 11, there is a tapering groove 31.8 formed on it, into which an end section of the spring element 13.8 is fitted. The free end of the spring element 13.8 is supported with zero-clearance in a groove 30.8 that is formed on the outer part 12 as in the case of variant A. A second group of spring elements 13.9 is fixed on the outer part 12 and with its free ends, supported by the inner part 11. These spring elements 13.9 taper, in the opposite manner to the first-mentioned spring elements 13.8, from the outer part 12 towards the inner part 11. The fixation on the outer part 12 takes place between ring segments 12.1, which form tapered grooves or mountings 31.9. The fixing of the ring segments 12.1 and the spring elements 13.9 can be carried out by means of a tightening ring 12.2. The support of the inner spring elements 13.9 on the inner part is provided by means of grooves 30.9 in accordance with Variant A.

Variant E shows, similar to Variant B, two parallel spring elements 13.10 or 13.11 in the form of wedge-shaped tapered leaf springs with similar deflection lines. Two such spring elements 13.10 or 13.11 each engage at their free ends with a common groove 30.10 or 30.11 on the outer part 12 or inner part 11, with the free ends of the spring elements 13.10 or 13.11 being spaced apart in the circumferential direction and in an unloaded state of the damper, being in contact with a groove flank. This enables repeated load on the spring elements. The fixation on the inner part 11 or outer part 12 takes place in a manner similar to Variant D by means of tapering grooves 31.10 and 31.11, into which the spring elements 13.10 or 13.11 are fitted at their end sections.

Variant F is different from Variant E in the additional arrangement of inserts 32.12 and 32.13 between the spring elements 13.12 and 13.13 of a spring element pair. The inserts 32.12 and 32.13 are each either arranged only in the zone of fixing of a spring element pair, which is implemented by means of a tapered groove 31.12 or 31.13 on the outer part 12 or inner part 11, or they can extend up to the vicinity of the spring tips, so that a prestressing of the springs in the groove 30.13 or 30.12 is also possible.

The spring elements of a spring element pair, whose free ends are supported by a common groove, as is shown in Variants B, C, E and F, can be assembled braced against each other in the circumferential direction of the damper or the coupling, so that the damper has zero-clearance in its zero position. In addition, a good sealing of the chambers 14 in the circumferential direction is achieved as a result.

The present invention has been disclosed with the help of a detailed description of various exemplary embodiments and variants. It is, however, not limited hereupon but comprises all embodiments defined in the accompanying claims.

The invention claimed is:

1. A torsional vibration damper or torsionally flexible coupling, comprising:
an inner part,
an outer part that is arranged in ring shape around the inner part, and
spring elements, which join the inner part and outer part in a torsionally flexible manner, wherein the spring elements subdivide a space formed between the inner part and the outer part into a plurality of successive chambers in the circumferential direction of the damper or the coupling, with these chambers being filled with a viscous medium and connected to one another, and wherein at least two groups of spring elements are provided, which have deflection lines that differ in circumferential direction, wherein first spring elements are formed on the inner part and with their free ends being supported by grooves on the outer part, wherein second spring elements are formed on the outer part and with their free ends being supported by grooves on the inner part, and wherein said first and second spring elements are supported with zero-clearance at their free ends in said grooves.

2. The torsional vibration damper or torsionally flexible coupling according to claim 1, wherein said spring elements are formed as leaf springs tapering in radial direction, and wherein the leaf springs of the first spring elements are tapered from the inner part towards the outer part and the leaf springs of the second spring elements are tapered from the outer part towards the inner part.

3. The torsional vibration damper or torsionally flexible coupling according to claim 1, wherein said spring elements are formed as pairs of parallel leaf springs tapering in radial direction, wherein the leaf springs in each of said pairs engage at their free ends with a common groove in such a way that at least in an unloaded state of the damper or the coupling, one leaf spring each is in contact with a groove flank and the free ends of the leaf springs are spaced apart in the circumferential direction of the damper or the coupling.

4. The torsional vibration damper or torsionally flexible coupling according to claim 3, wherein the leaf springs of said pair of parallel leaf springs are braced against each other in the circumferential direction of the damper or the coupling.

5. The torsional vibration damper or torsionally flexible coupling according to claim 1, wherein the chambers are delimited in the axial direction by side plates, wherein overflow gaps are formed between the spring elements and the side plates, which connect adjacent chambers with one another.

6. The torsional vibration damper according to claim 5, wherein the side plates are fastened to the inner part and in connection with it form a housing that surrounds the outer part.

7. The torsional vibration damper according to claim 5, wherein between a ring section of the outer part and the side plates a sliding bearing is each arranged in the axial direction.

8. A torsional vibration damper or torsionally flexible coupling, comprising:
an inner part,
an outer part that is arranged in ring shape around the inner part, and
spring elements each having a Z-shape, which join the inner part and outer part in a torsionally flexible manner,
wherein the spring elements subdivide a ring-shaped space formed between the inner part and the outer part into a plurality of successive chambers in the circumferential direction of the damper or the coupling, with these chambers being filled with a viscous medium and connected to one another, and
wherein at least two groups of spring elements are provided, which have deflection lines that differ in circumferential direction,
wherein the inner part, the outer part and the spring elements are made as one single piece.

9. The torsional vibration damper or torsionally flexible coupling according to claim 8, wherein said spring elements include first spring elements that are tapered from the inner part towards the outer part and second spring elements that are tapered from the outer part towards the inner part.

10. The torsional vibration damper or torsionally flexible coupling according to claim 8, wherein the chambers are delimited in the axial direction by side plates, wherein overflow gaps are formed between the spring elements and the side plates, which connect adjacent chambers with one another.

11. The torsional vibration damper or torsionally flexible coupling according to claim 10, wherein the side plates are fastened to the inner part and in connection with it form a housing that surrounds the outer part.

12. The torsional vibration damper or torsionally flexible coupling according to claim 10, wherein between a ring section of the outer part and the side plates a sliding bearing is each arranged in axial direction.

13. A torsional vibration damper or torsionally flexible coupling, comprising:
an inner part,
an outer part that is arranged in ring shape around the inner part, and
spring elements, which join the inner part and outer part in a torsionally flexible manner,
wherein the spring elements subdivide a ring-shaped space formed between the inner part and the outer part into a plurality of successive chambers in the circumferential direction of the damper or the coupling, with these chambers being filled with a viscous medium and connected to one another, and
wherein at least two groups of spring elements are provided, which have deflection lines that differ in circumferential direction,
wherein the spring elements are made as separate components that are fastened or at least supported by the inner part and the outer part, respectively,
wherein first spring elements are fastened with a first end to the inner part and with a second free end supported by a groove on the outer part, respectively,
wherein second spring elements are fastened with a first end to the outer part and with a second free end supported by a groove on the inner part, respectively, and
wherein said first and second spring elements are supported in said grooves with zero-clearance at their free ends.

14. The torsional vibration damper or torsionally flexible coupling according to claim 13, wherein said spring elements are formed as leaf springs tapering in radial direction, and wherein the leaf springs of the first spring elements are tapered from the inner part towards the outer part and the leaf springs of the second spring elements are tapered from the outer part towards the inner part.

15. The torsional vibration damper or torsionally flexible coupling according to claim 13, wherein the first spring elements are tapered from the inner part towards the outer part and the second spring elements are tapered from the outer part towards the inner part.

16. The torsional vibration damper or torsionally flexible coupling according to claim 13, wherein said spring elements are formed as pairs of parallel leaf springs with similar deflection lines and tapering in radial direction, wherein the leaf springs of the first spring elements are tapered from the inner part towards the outer part and the leaf springs of the second spring elements are tapered from the outer part towards the inner part.

17. The torsional vibration damper or torsionally flexible coupling according to claim 16, wherein in a pair of two leaf springs with similar deflection lines the leaf springs are fixed and spaced apart by one or more inserts at their first end.

18. The torsional vibration damper or torsionally flexible coupling according to claim 16, wherein the leaf springs in each of said pairs engage at their second free ends with a common groove in such a way that at least in an unloaded state of the damper or the coupling, one leaf spring each is in contact with a groove flank and the free ends of the leaf springs are spaced apart in the circumferential direction of the damper or the coupling.

19. The torsional vibration damper or torsionally flexible coupling according to claim 13, wherein the chambers are delimited in the axial direction by side plates, wherein overflow gaps are formed between the spring elements and the side plates, which connect adjacent chambers with one another.

20. The torsional vibration damper according to claim 19, wherein the side plates are fastened to the inner part and in connection with it form a housing that surrounds the outer part.

21. The torsional vibration damper according to claim 19, wherein between a ring section of the outer part and the side plates a sliding bearing is each arranged in the axial direction.

22. A torsional vibration damper, comprising:
- an inner part,
- an outer part that is arranged in ring shape around the inner part, and
- spring elements, which join the inner part and outer part in a torsionally flexible manner,
- wherein the spring elements subdivide a ring-shaped space formed between the inner part and the outer part into a plurality of successive chambers in the circumferential direction of the damper or the coupling, with these chambers being delimited by side plates and being filled with a viscous medium and connected to one another, and
- wherein at least two groups of spring elements are provided, which have deflection lines that differ in circumferential direction, and
- wherein between a ring section of the outer part and the side plates a sliding bearing is each arranged in the axial direction.

* * * * *